Figures 1, 2:
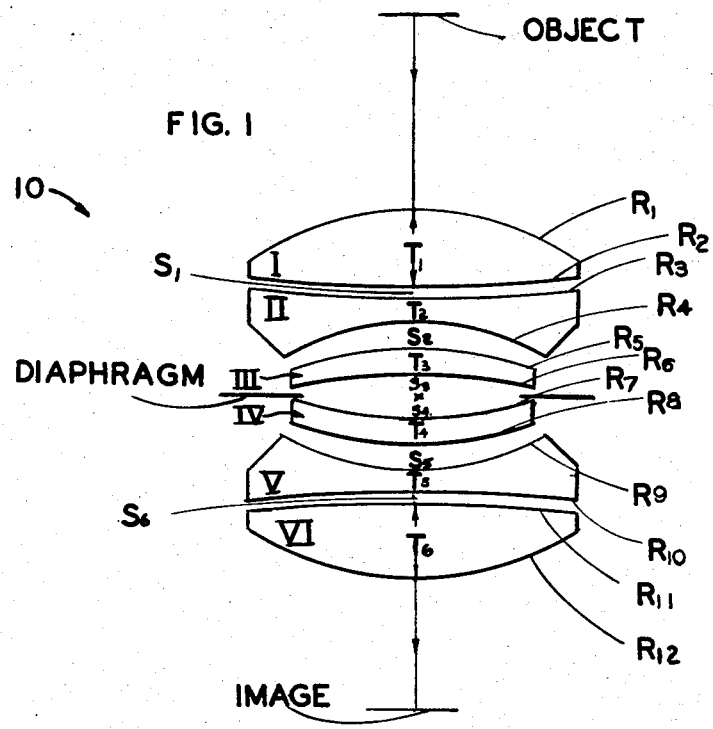

May 25, 1965     E. I. BETENSKY ET AL     3,185,031
SYMMETRICAL PROJECTION OBJECTIVE
Filed Sept. 4, 1962

| E.F.L.=240.92   f/4.2 | | | MAGNIFICATION | | 1:1 | |
|---|---|---|---|---|---|---|
| LENS | FOCAL LENGTH | RADII | THICKNESS | SPACE | $n_D$ | $V$ |
| I | 85.4863 | $R_1$=59.7035<br>$R_2$(-)=420.727 | $T_1$=15.48 | $S_1$=1.84 | 1.612 | 59.5 |
| II | -72.026 | $R_3$(-)=337.287<br>$R_4$=45.052 | $T_2$=5.25 | $S_2$=5.04 | 1.541 | 47.3 |
| III | 325.6728 | $R_5$=73.1139<br>$R_6$=113.763 | $T_3$=6.15 | $S_3$=3.65 | 1.588 | 61.2 |
| IV | 325.6728 | $R_7$(-)=113.763<br>$R_8$(-)=73.1139 | $T_4$=6.15 | $S_4$=3.65 | 1.588 | 61.2 |
| V | -72.026 | $R_9$(-)=45.052<br>$R_{10}$=337.287 | $T_5$=5.25 | $S_5$=5.04 | 1.541 | 47.3 |
| VI | 85.4863 | $R_{11}$=420.727<br>$R_{12}$(-)=59.7035 | $T_6$=15.48 | $S_6$=1.84 | 1.612 | 59.5 |

*INVENTORS*
*ELLIS I. BETENSKY*
*NATHAN RICKLESS*
BY   *Frank C. Parker*
ATTORNEY 3,185,031
SYMMETRICAL PROJECTION OBJECTIVE
Ellis I. Betensky, Rochester, and Nathan Rickless, Brighton, N.Y., assignors to Bausch & Lomb Incorporated, Rochester, N.Y., a corporation of New York
Filed Sept. 4, 1962, Ser. No. 220,977
4 Claims. (Cl. 88—57)

This invention relates to a symmetrical projection objective which is suitable for copying and process work and more particularly it relates to improvements therein.

It is an object of this invention to provide a novel, symmetrical type of projection objective for copying and process work at or near unity magnification which is simple in construction and low in cost but nevertheless capable of high-grade optical performance, said objective being corrected for chromatic and monochromatic image aberrations as well as astigmatism, coma, distortion and field curvature.

Further objects and advantages of this invention will be apparent from the details of construction as set forth in the specification taken in connection with the accompanying drawing.

In the drawing:
FIG. 1 is an optical diagram showing a preferred form of the present invention, and
FIG. 2 is a chart showing the constructional data which is related to the construction of a preferred form of this invention in accordance with that shown in FIG. 1.

As aforesaid, a preferred form of the present invention is shown in FIG. 1, wherein the numeral 10 designates generally the objective, said objective comprising a pair of double convex lenses I and VI which are optically aligned with each other and are spaced apart. Adjacent to the inner sides of said lenses I and VI there is spaced a pair of double concave lenses II and V having concave inner surfaces facing each other. Spaced between said lenses II and V is a third pair of lenses III and IV which are of meniscus form and have concave surfaces facing each other on opposite sides of an interposed central diaphragm.

In order to achieve the stated objects of this invention, the focal lengths which are designated $F_I$ and $F_{VI}$, which are related to the successive lenses I and VI, have values as given in the mathematical statements in the table herebelow:

$$F_I = F_{VI} = .354F$$
$$-F_{II} = -F_V = .298F$$
$$F_{III} = F_{IV} = 1.351F$$
substantially absolute values wherein said values are given in terms of the equivalent focal length of the objective which is designated F.

Further constructional data which achieve the objects of this invention are given with respect to the successive lens thicknesses $t_1$ to $t_6$, the subscripts being numbered progressively from the entrance side of the object side to the image side of the objective, the successive interlens air spaces $S_1$ to $S_6$, the refractive index $n_D$ and Abbe member $\nu$ of the successive lenses having values as given in the consolidated table of mathematical statements given herebelow:

$.0611F < t_1 = t_6 < .0675F$
$.0207F < t_2 = t_5 < .0227F$
$.02425F < t_3 = t_4 < .02665F$
$.00726F < S_1 = S_6 < .00802F$
$.0199F < S_2 = S_5 < .0219F$
$.01483F < S_3 = S_4 < .01593F$
$1.605 < n_D \text{ (I)} = n_D \text{ (VI)} < 1.617$
$1.538 < n_D \text{ (II)} = n_D \text{ (V)} < 1.545$
$1.575 < n_D \text{ (III)} = n_D \text{ (IV)} < 1.605$
$55.0 < \nu\text{(I)} = \nu \text{ (VI)} < 65.0$
$45.0 < \nu \text{ (II)} = \nu \text{ (V)} < 50.0$
$56.0 < \nu \text{ (III)} = \nu \text{ (IV)} < 66.0$ Together with the ranges of values as given for the constructional data hereabove, the specification for a range of values for the radii of the successive lens surfaces which are designated $R_1$ to $R_{12}$ is given herebelow in terms of the equivalent focal lengths F, the minus (—) signs accompanying the R designations means that the lens surface is concave with respect to entrant rays of light.

$.2275F < R_1 < .2515F$
$1.660F < -R_2 < 1.824F$
$1.331F < -R_3 < 1.459F$
$.1772F < R_4 < .1958F$
$.2872F < R_5 < .3174F$
$.451F < R_6 < .496F$
$.451F < -R_7 < .496F$
$.2872F < -R_8 < .3174F$
$.1772F < -R_9 < .1958F$
$1.331F < R_{10} < 1.459F$
$1.660F < R_{11} < 1.824F$
$.2275F < -R_{12} < .2515F$

More specifically, the above values given for the raddii, lens thicknesses, spacings, refractive index and Abbe number are given for a preferred form of the invention in the table of mathematical statements given herebelow:

$R_1 = .2478F$
$-R_2 = 1.746F$
$-R_3 = 1.400F$
$R_4 = .1870F$
$R_5 = .30348F$
$R_6 = .4722F$
$-R_7 = .4722F$
$-R_8 = .30348F$
$-R_9 = .1870F$
$R_{10} = 1.400F$
$R_{11} = 1.746F$
$-R_{12} = .2478F$
$t_1 = t_6 = .0643F$
$t_2 = t_5 = .0217F$
$t_3 = t_4 = .02553F$
$S_1 = S_6 = .00764F$
$S_2 = S_5 = .0209F$
$S_3 = S_4 = .01513F$
$n_D \text{ (I)} = n_D \text{ (VI)} = 1.612$
$n_D \text{ (II)} = n_D \text{ (V)} = 1.541$
$n_D \text{ (III)} = n_D \text{ (IV)} = 1.588$
$\nu \text{ (I)} = \nu \text{ (VI)} = 59.5$
$\nu \text{ (II)} = \nu \text{ (V)} = 47.3$
$\nu \text{ (III)} = \nu \text{ (IV)} = 61.2$ The objective 10 is particularly designed for the exact and precise projection of copy material onto a receiving surface, not shown, using light rays having wave lengths in the range of 440mu–580 mu, the peak of transmission being at or about 500 mu. Furthermore, the present objective works at about unity magnification and in the preferred form of the invention as given hereabove the object distance and the image distance are both equal to substantially 1.846F.

Stated in another manner and still more precisely, said preferred form of the objective 10 may be constructed by the use of the chart of constructional data found herebelow, wherein the designations for the various constructional data are the same as given hereabove in connection with the various tables of values. All such values which designate linear measure are given in millimeters.

[E.F.L.=240.92   f/4.2   Magnification 1:1]

| Lens | Focal length | Radii | Thickness | Space | $n_D$ | $\nu$ |
|---|---|---|---|---|---|---|
| I | 85.4863 | $R_1 = 59.7035$ | $t_1=15.48$ | | 1.612 | 59.5 |
| | | $-R_2 = 420.727$ | | $S_1=1.84$ | | |
| II | −72.026 | $-R_3 = 337.287$ | $t_2=5.25$ | | 1.541 | 47.3 |
| | | $R_4 = 45.052$ | | $S_2=5.04$ | | |
| III | 325.6728 | $R_5 = 73.1139$ | $t_3=6.15$ | | 1.588 | 61.2 |
| | | $R_6 = 113.763$ | | $S_3=3.65$ | | |
| | | | | $S_4=3.65$ | | |
| IV | 325.6728 | $-R_7 = 113.763$ | $t_4=6.15$ | | 1.588 | 61.2 |
| | | $-R_8 = 73.1139$ | | $S_5=5.04$ | | |
| V | −72.026 | $-R_9 = 45.052$ | $t_5=5.25$ | | 1.541 | 47.3 |
| | | $R_{10} = 337.287$ | | $S_6=1.84$ | | |
| VI | 84.4863 | $R_{11} = 420.727$ | $t_6=15.48$ | | 1.612 | 59.5 |
| | | $-R_{12} = 59.7035$ | | | | |

All dimensions are given in millimeters and the minus (−) sign denotes lens surfaces which are concave to entrant rays which travel from object side to image side of the objective.

The corresponding mathematical value of the object and the imaged distances is specified as substantially 446.18 mm.

Although only a preferred form of this invention has been shown and described in detail, various changes and modifications may be made therein and changes may be made in the precise numerical values therein mentioned without departing from the spirit of the invention as set forth in the claims herebelow.

We claim:

1. A symmetrical projection objective for copying and process work substantially at unity magnification comprising a pair of double convex lenses, in mutual optical alignment and spaced apart,
a pair of double concave lenses, optically aligned between and spaced from the double convex lenses, and
a pair of meniscus lenses aligned between and spaced from said double concave lenses on opposite sides of a central diaphragm, each meniscus lens having a concave surface facing said diaphragm, the values of radii, which are designated $R_1$ to $R_{12}$ of the successive lens surfaces, numbering from the entrant side of the objective and designating those surfaces which are concave to the entrant rays by a minus sign, being given in the table of mathematical statements herebelow along with the values of the successive lens thicknesess which are designated $t_1$ to $t_6$, and the values of the successive lens spacings which are designated $S_1$ to $S_6$, and further specifying the refractive index $n_D$ and Abbe number $\nu$ for the lens materials of the successive lenses I to VI, $.2275F < R_1 < .2515F$
$1.660F < -R_2 < 1.824F$
$1.331F < -R_3 < 1.459F$
$.1772F < R_4 < .1958F$
$.2872F < R_5 < .3174F$
$.451F < R_6 < .496F$
$.451F < -R_7 < .496F$
$.2872F < -R_8 < .3174F$
$.1772F < -R_9 < .1958F$
$1.331F < R_{10} < 1.459F$
$1.660F < R_{11} < 1.824F$
$.2275F < -R_{12} < .2515F$
$.0611F < t_1 = t_6 < .0675F$
$.0207F < t_2 = t_5 < .0227F$
$.02425F < t_3 = t_4 < .02665F$
$.00726F < S_1 = S_6 < .00802F$
$.0199F < S_2 = S_5 < .0219F$
$.01483F < S_3 = S_4 < .01593F$
$1.605 < n_D \text{ (I)} = n_D \text{ (VI)} < 1.617$
$1.538 < n_D \text{ (II)} = n_D \text{ (V)} < 1.545$
$1.575 < n_D \text{ (III)} = n_D \text{ (IV)} < 1.605$
$55.0 < \nu \text{ (I)} = \nu \text{ (VI)} < 65.0$
$45.0 < \nu \text{ (II)} = \nu \text{ (V)} < 50.0$
$56.0 < \nu \text{ (III)} = \nu \text{ (IV)} < 66.0$ 2. A symmetrical projection objective for copying and process work substantially at unity magnification comprising a pair of double convex lenses, in optical alignment and spaced apart,
a pair of double concave lenses, optically aligned between and spaced from the double convex lenses, and
a pair of meniscus lenses aligned between and spaced between said double concave lenses on opposite sides of a central diaphragm, each meniscus lens having a concave surface facing said diaphragm, the values of radii, which are designated $R_1$ to $R_{12}$ of the successive lens surfaces numbering from the entrant side of the objective and designating those surfaces which are concave to the entrant rays by a minus sign, being given in the table of mathematical statements herebelow along with the values of the successive lens thicknesses which are designated $t_1$ to $t_6$, and the values of the successive lens spacings which are designated $S_1$ to $S_6$, and further specifying the refractive index $n_D$ and Abbe number $\nu$ for the lens materials of the successive lenses I to VI, $R_1 = .2478F$
$-R_2 = 1.746F$
$-R_3 = 1.400F$
$R_4 = .1870F$
$R_5 = .30348F$
$R_6 = .4722F$
$-R_7 = .4722F$
$-R_8 = .30348F$
$-R_9 = .1870F$
$R_{10} = 1.400F$
$R_{11} = 1.746F$
$-R_{12} = .2478F$
$t_1 = t_6 = .0643F$ $t_2=t_5=.0217F$
$t_3=t_4=.02553F$
$S_1=S_6=.00764F$
$S_2=S_5=.0209F$
$S_3=S_4=.01513F$
$n_D$ (I) $=n_D$ (VI) $=1.612$
$n_D$ (II) $=n_D$ (V) $=1.541$
$n_D$ (III) $=n_D$ (IV) $=1.588$
$\nu$ (I) $=\nu$ (VI) $=59.5$
$\nu$ (II) $=\nu$ (V) $=47.3$
$\nu$ (III) $=\nu$ (IV) $=61.2$ 3. A symmetrical projection objective according to claim 2 wherein all of the air-glass surfaces have an anti-reflection coating formed thereon which transmits light rays in the range of $\lambda=440$ mu to 580 mu.

4. A symmetrical projection objective for copying and process work substantially at unity magnification comprising a pair of double convex lenses, in optical alignment and spaced apart,
   a pair of double concave lenses, optically aligned between and spaced from the double convex lenses, and
   a pair of meniscus lenses aligned between and spaced between said double concave lenses on opposite sides of a central diaphragm, each meniscus lens having a concave surface facing said diaphragm,
   the constructional data for said objective being given in the chart of values presented herebelow wherein $R_1$ to $R_{12}$ represent the radii of the successive lens surfaces numbering from the front of the objective, $t_1$ to $t_6$ represent the corresponding lens thicknesses of said lenses I to VI, $S_1$ to $S_6$ represent the interlens air spaces thereof, and $n_D$ and $\nu$ represent respectively the refractive index and the Abbe number of the lens materials used in said lenses,

[E.F.L.=240.92    $f/4.2$    Magnification 1:1]

| Lens | Focal length | Radii | Thickness | Space | $n_D$ | $\nu$ |
|---|---|---|---|---|---|---|
| I | 85.4863 | $R_1$ =59.7035<br>$-R_2$ =420.727 | $t_1$=15.48 | | 1.612 | 59.5 |
| | | | | $S_1$=1.84 | | |
| II | −72.026 | $-R_3$ =337.287<br>$R_4$ =45.052 | $t_2$=5.25 | | 1.541 | 47.3 |
| | | | | $S_2$=5.04 | | |
| III | 325.6728 | $R_5$ =73.1139<br>$R_6$ =113.763 | $t_3$=6.15 | | 1.588 | 61.2 |
| | | | | $S_3$=3.65<br>$S_4$=3.65 | | |
| IV | 325.6728 | $-R_7$ =113.763<br>$-R_8$ =73.1139 | $t_4$=6.15 | | 1.588 | 61.2 |
| | | | | $S_5$=5.04 | | |
| V | −72.026 | $-R_9$ = 45.052<br>$R_{10}$=337.287 | $t_5$=5.25 | | 1.541 | 47.3 |
| | | | | $S_6$=1.84 | | |
| VI | 84.4860 | $R_{11}$=420.727<br>$-R_{12}$=59.7035 | $t_6$=15.48 | | 1.612 | 59.5 |

All dimensions are given in millimeters and the minus (−) sign denotes lens surfaces which are concave to entrant rays passing from the object side to the image side of the objective.

References Cited by the Examiner

UNITED STATES PATENTS

| 1,792,917 | 2/31 | Merte | 88—57 |
| 3,018,689 | 1/62 | Saxe | 88—57 |
| 3,088,371 | 5/63 | Lowenthal | 88—57 |

JEWELL H. PEDERSEN, *Primary Examiner.*

UNITED STATES PATENT OFFICE
CERTIFICATE OF CORRECTION

Patent No. 3,185,031  May 25, 1965

Ellis I. Betensky et al.

It is hereby certified that error appears in the above numbered patent requiring correction and that the said Letters Patent should read as corrected below.

Column 1, line 58, for "member" read -- number --; column 2, line 17, for "means" read -- meaning --; line 35, for "raddii" read -- radii --; column 3, line 57, for imaged" read -- image --; column 6, in the table, under the column heading "Focal length", last line thereof, for "84.4860" read -- 84.4863 --.

Signed and sealed this 7th day of December 1965.

(SEAL)
Attest:

ERNEST W. SWIDER
Attesting Officer

EDWARD J. BRENNER
Commissioner of Patents